C. W. STAHLE.
FLUID GAGE.
APPLICATION FILED JUNE 26, 1914.
1,141,500.          Patented June 1, 1915.
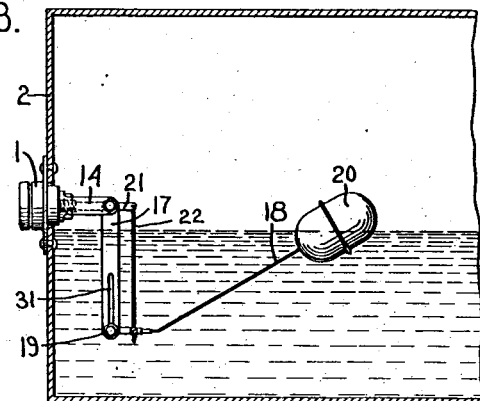
Fig. 3.
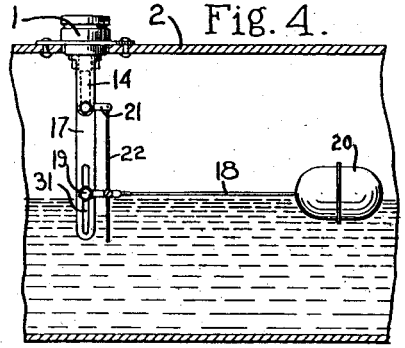
Fig. 4.
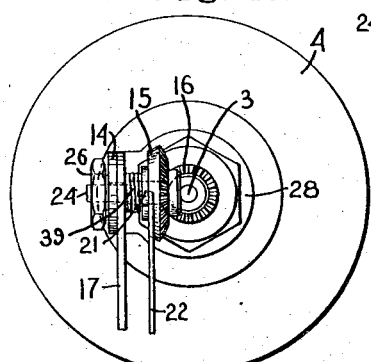
Fig. 2.
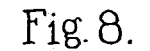
Fig. 8.
Fig. 1.
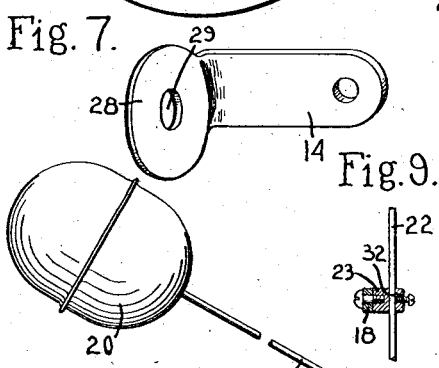
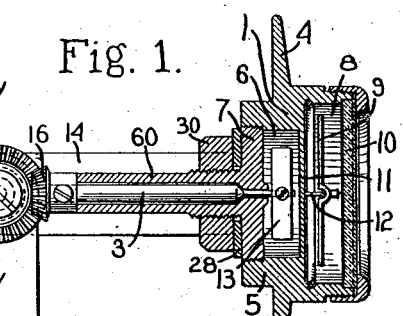
Fig. 5.
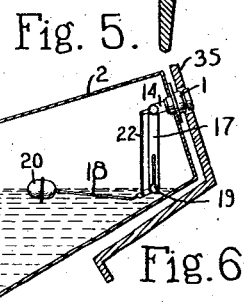
Fig. 7.
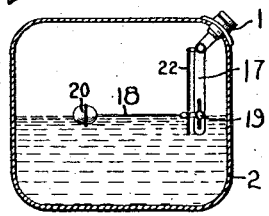
Fig. 6.
Fig. 9.
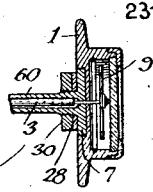
Fig. 10.
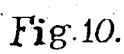
Witnesses.
J. Morrill Fuller
William E. Gagen
Inventor
Carl W. Stahle,
by Heard Smith & Tennant.
Att'y's

UNITED STATES PATENT OFFICE.

CARL W. STAHLE, OF EVERETT, MASSACHUSETTS, ASSIGNOR TO BOSTON AUTO GAGE COMPANY, OF BOSTON, MASSACHUSETTS, A CORPORATION OF MASSACHUSETTS.

FLUID-GAGE.

1,141,500.  Specification of Letters Patent.  Patented June 1, 1915.

Application filed June 26, 1914. Serial No. 847,521.

*To all whom it may concern:*

Be it known that I, CARL W. STAHLE, a citizen of the United States, residing at Everett, county of Middlesex, State of Massachusetts, have invented an Improvement in Fluid-Gages, of which the following description, in connection with the accompanying drawing, is a specification, like characters on the drawing representing like parts.

This invention relates to fluid gages such as are used for indicating the level of fluid in a tank, and it has for its principal object to provide a fluid gage of this nature which can be used in a great variety of positions and will accurately indicate the liquid level in the tank in any one of these positions.

While the invention is capable of general use wherever a fluid gage is desired, it has special advantages when used in connection with automobiles for indicating the level of gasolene in the gasolene tank because it provides a gage which can be successfully used in anyone of a great variety of tanks such as are commonly used on different makes of automobiles for containing gasolene.

The gasolene tanks of different makes of automobiles differ in size, shape and location on the car. Some tanks are so located and constructed that an upright gage can be set into the top of the tank. Other tanks are so located that the gage must be set into the end of the tank, and other tanks are so positioned and shaped that the gage must be in one corner or in some other special place in order to be accessible. Heretofore it has been necessary to design special gages for special shapes of tanks and for special positions in the tanks.

As stated above, it is one of the objects of my invention to provide a sort of universal gage which is so constructed that it can be placed either in the top of the tank, the end of the tank, the corner of the tank, or in any other location and yet can be adjusted to accurately gage or indicate the liquid level in the tank.

In order to give a proper understanding of my invention I have illustrated in the drawings a selected embodiment thereof and have shown various ways in which the gage may be installed.

In the drawings, Figure 1 is a vertical sectional view partly in elevation showing one embodiment of my improved gage; Fig. 2 is a view of a part of the device shown in Fig. 1 looking to the right; Fig. 3 shows one way of installing my improved gage in the end of a tank; Fig. 4 shows the device installed in the top of the tank; Fig. 5 shows the gage installed as a so-called "cowl" gage; Fig. 6 shows the gage installed in the corner of the tank; Fig. 7 is a detail of the bracket to which the adjustable arm is secured; Fig. 8 is a section on the line $y$—$y$, Fig. 1; Fig. 9 is a section on the line $x$—$x$, Fig. 1. Fig. 10 is a fragmentary sectional view showing a non-magnetic head.

My improved gage comprises a supporting member adapted to be secured to the wall of a tank and in which an indicator-operating shaft is journaled, an arm connected to said member and capable of adjustment into different angular positions relative to the shaft, a float arm pivoted to said adjustable arm, and connections between the float arm and the shaft whereby rising and falling movement of the float arm will turn the shaft. These connections are so constructed that the arm to which the float arm is pivoted may be swung into position parallel to the shaft or into a position at right angles thereto, or into any intermediate position, depending upon the particular way in which the gage is to be installed in the tank, and in all these positions the connections are operative to transmit the rising and falling movement of the float arm to the indicator-operating shaft and thus to the indicator.

My invention may be embodied in a gage wherein the indicating pointer is connected directly to the shaft or in a so-called magnetic gage wherein the indicating pointer is controlled as to its position by a magnet which is in turn secured to said indicator-operating shaft.

The supporting member for sustaining the shaft may have any suitable or appropriate construction. In the illustrated embodiment of my invention this supporting member includes a head 1 which is adapted to be secured to the tank in some suitable way and a bearing member 60 carried by the head and in which the indicator-operating shaft 3 is mounted. While the head 1 may be made in various ways without departing from the invention, the construction herein shown is one in which said head is formed with a portion 5 which sets into an opening in the wall of the tank 2 and with a flange 4 which overlies the wall of the tank and is secured thereto so as to make a tight joint. This head is chambered on its inner face, as shown at 6, and the bearing member 60 is provided with a head 7 which screw-threads into the chambered portion 6, thus providing a construction whereby the shaft bearing can be readily removed from the head or replaced in position if this becomes necessary. The head 1 is provided on its outer face with a chamber 8 in which the indicating pointer 9 is located, said chamber preferably being covered by a glass disk 10. This pointer 9 may be rigidly secured to the shaft 3 as shown in Fig. 10 or it may be operated magnetically from the shaft 3. The latter construction is that herein illustrated, the two chambers 6 and 8 being separated by a thin partition 11 and the indicating pointer 9 being pivotally mounted on a pivot pin 12 and being controlled by a magnet 13 operating in the chamber 6 and fast on the shaft 3, this being a more or less familiar construction in magnetically-operated gages. Associated with the bearing member and forming part of the supporting member is an arm or bracket 14 on the end of which is pivotally sustained a bevel gear 15 that meshes with a bevel gear 16 mounted on the indicator-operating shaft 3. Connected to the end of the bracket 14 is an arm 17 to the lower end of which a float arm 18 is pivoted, as shown at 19, said float arm carrying a float 20 of suitable construction. Connections are provided between the float arm 18 and the bevel gear 15 so that the rising and falling movement of the float arm will be communicated to the gear 15 and thus to the shaft 3. While any suitable connections for accomplishing this end may be employed, I propose to provide the bevel gear 15 with an arm 21 which may be brazed or soldered thereto or secured thereto in any suitable way and to which is pivotally connected one end of a link 22, the other end of said link being pivoted to the arm 18 at 23.

The arm 17 is connected to the bracket 14 so as to permit said arm to assume different angular positions relative to the shaft 3, depending on the way in which the gage is to be installed in the tank. In Figs. 1 and 3, for instance, the arm 17 is situated at approximately right angles to the shaft 3, while in Fig. 4 said arm is situated in line with the shaft and in Figs. 5 and 6 said arm is situated at an angle other than a right angle to the shaft. Any suitable means for thus movably connecting the arm 17 to the bracket 14 may be adopted without departing from my invention. As herein shown, I mount the arm 17 upon the stud 24 which is carried in the bracket 14 and on which the gear 15 is rotatably mounted, said stud being provided with a shoulder 25 to engage the arm 17 and with a clamping nut 26 by which the arm can be clamped in its adjusted position. The arm 17 may be readily adjusted into desired position by simply loosening the nut 26 and then swinging the arm about the stud 24 into its desired position, after which the tightening of the nut 26 will lock the arm in such position. The bracket 14 is also preferably adjustably mounted on the bearing member 60, so that it may be turned into different positions.

One convenient construction is that herein shown wherein the bracket 14 is provided with the foot portion 28 that overlies the head 7 and is provided with an aperture through which the bearing member 60 extends, said foot member being clamped in position by a clamping nut 30 screw-threaded to the bearing member. This construction permits the bracket 14 to be adjusted in different position relative to the head 1. I will preferably also make the connection between the float arm 18 and the gear 15 adjustable so as to permit the float arm to be pivoted to the arm 17 at different distances from the gear. In the illustrated embodiment of my invention this adjustment is provided for by making the stud 19 on which the float arm 18 is pivoted adjustable in a slot 31 formed in the arm 2 and by making the pivotal connection between the link 22 and the arm 18 in the form of a stud 23 which is pivoted to the arm and through which the lower end of the link extends, said link being clamped to the stud by means of a clamping screw 32.

A gage having this construction is a readily adjustable gage capable of being mounted in tanks of various shapes and of being installed in said tanks in various positions. A few of the different ways of installing this universal gage are shown in the drawings. In Fig. 3, for instance, a gage is installed in the end of the tank 2, in which case the arm 17 will be adjusted into a substantially vertical position at right angles to the shaft 3 which extends horizontally. In Fig. 4 I have shown the gage installed as an upright gage in which case the head 1 will be set into the top of the tank and the arm 17 will be adjusted into parallelism with the shaft 3.

In Fig. 5 I have shown the gage installed as a so-called "cowl" gage. In this construction the gage is set into one end of the tank 2 with the head 1 extending through the cowl board 35 of the automobile and the arm 17 adjusted to extend substantially vertically.

In Fig. 6 I have shown the gage installed in a corner of a tank in which case the shaft 3 will extend at an inclination, while the arm will be adjusted into a substantially vertical position, it being understood of course that the head 1 of the gage is of the proper shape to fit the exterior contour of the tank.

In all these installations it is necessary, of course, to so adjust the pivotal point 19 for the float arm and said arm 17 that the float 20 will have a free movement from the top to the bottom of the tank.

I have shown a spring 39 on the stud 24 for yieldingly holding the gear 15 in mesh with the gear 14. This allows the gears to operate easily and obviates any possibility that they will bind.

While I have illustrated herein a selected embodiment of my invention, I do not wish to be limited to the constructional details shown.

I claim:

1. In a gage, the combination with a supporting member provided with means to be secured to the wall of a tank, of an indicator-operating shaft journaled in said supporting member, an arm connected to said member and capable of movement into different angular positions relative to said shaft, a float arm pivoted to said arm, and connections between said float arm and said shaft.

2. In a gage, the combination with a supporting member provided with means to be secured to the wall of a tank, of an indicator-operating shaft journaled in said supporting member, an arm connected to said member and capable of movement into different angular positions relative to said shaft, a float arm adjustably pivoted to said arm, and adjustable connections between said float arm and said shaft.

3. In a gage, the combination with a supporting member having means for securing it to the wall of a tank, of an indicator-operating shaft journaled in said supporting member, bevel gearing sustained by said member for operating said shaft, an arm connected to said supporting member and capable of adjustment into different angular positions relative to said shaft, a float arm pivoted to said arm, and connections between said float arm and said gearing.

4. In a gage, the combination with a supporting member having means for securing it to the wall of a tank, of an indicator-operating shaft journaled in said supporting member, bevel gearing sustained by said member for operating said shaft, an arm connected to said supporting member and capable of adjustment into different angular positions relative to said shaft, a float arm adjustably pivoted to said arm, and adjustable connections between said float arm and said gearing.

5. In a gage, the combination with a head adapted to be secured to the wall of a tank, of an indicator-operating shaft rotatably sustained by said head, a bracket connected to said head, intermeshing bevel gears carried by said shaft and bracket, respectively, an arm sustained by said bracket and capable of movement into different angular positions relative to said shaft, a float arm pivoted to said arm, and connections between said float arm and the bevel gear carried by the bracket.

6. In a gage, the combination with a head, of a bearing member sustained thereby, an indicator-operating shaft rotatably mounted in said bearing member, a bracket secured to the bearing member, intermeshing bevel gears carried by the bracket and shaft, respectively, an arm adjustably connected to the bracket, a float arm pivoted to said arm, and connections between said float arm and bevel gear carried by the bracket.

In testimony whereof, I have signed my name to this specification, in the presence of two subscribing witnesses.

CARL W. STAHLE.

Witnesses:
LOUIS C. SMITH,
THOMAS J. DRUMMOND.